United States Patent [19]
Kleinböhl

[11] Patent Number: 4,756,283

[45] Date of Patent: Jul. 12, 1988

[54] IGNITION LEAD ARRANGEMENT

[75] Inventor: Helmut Kleinböhl, Riedstadt, Fed. Rep. of Germany

[73] Assignee: General Motors Corporation, Detroit, Mich.

[21] Appl. No.: 45,441

[22] Filed: May 4, 1987

[30] Foreign Application Priority Data

Jul. 10, 1986 [DE] Fed. Rep. of Germany ....... 3623199

[51] Int. Cl.[4] .......................... F02P 15/00; H02B 1/20

[52] U.S. Cl. ............................ 123/143 C; 123/169 P; 174/72 A

[58] Field of Search ...... 123/169 P, 169 PA, 169 PH, 123/143 C; 174/72 A, 72 TR

[56] References Cited

U.S. PATENT DOCUMENTS 1,979,523 11/1934 Barnett ............................ 123/143 C 2,048,890 7/1936 Rabezzana .................. 123/143 C X 2,488,096 11/1949 Newman ......................... 123/143 C 3,104,658 9/1963 Olsen ............................... 123/143 C 3,339,010 8/1967 Brentrup .................. 123/169 PA X

FOREIGN PATENT DOCUMENTS 3150220 7/1983 Fed. Rep. of Germany .

715844 12/1931 France ............................ 123/143 C

*Primary Examiner*—Tony M. Argenbright

*Attorney, Agent, or Firm*—F. J. Fodale

[57] ABSTRACT

An ignition lead arrangement comprising individual ignition leads which are constructed as flat cables which are integrated to a single molding for connection to an ignition distributor. The arrangement also comprises the necessary sockets for connection to the spark plugs and ignition coil which are covered with the insulating rubber which also forms the insulating material for the individual ignition leads.

6 Claims, 1 Drawing Sheet

IGNITION LEAD ARRANGEMENT

BACKGROUND OF THE INVENTION

The present invention pertains to an ignition lead arrangement comprising a plurality of ignition leads connecting an ignition distributor with spark plugs and an ignition coil. The present invention also pertains to a process for manufacturing such an ignition lead arrangement.

Ignition lead arrangements of the above-described type are provided in present day motor vehicles. Five ignition leads of different lengths are currently manufactured individually as ignition leads for a four-cylinder internal combustion engine. The contact pins and connection sockets must be attached by hand, and two rubber insulating caps per lead, i.e., a total of ten such rubber insulating caps, must be installed. Automatic assembly is therefore impossible.

Even though flat cable trees have been known for other applications, as is described, e.g., in DE-OS 31 50 220, these are only used when a plurality of cables must lead in parallel to a plurality of users, so that a flat cable tree of the prior art type does not offer any advantages for the ignition leads, because these must lead in different directions to the individual spark plugs and to the ignition coil immediately from the ignition distributor.

SUMMARY OF THE INVENTION

The object of the present invention is to provide an ignition lead arrangement of the type described in the introduction, which can be manufactured at a substantially lower cost than the prior art ignition lead arrangements and which permits automatic assembly and to provide a process for manufacturing such an ignition lead arrangement.

This is accomplished according to the present invention in that the ignition leads are constructed as flat cables which, at their distributor end, pass laterally into each other to form a single molding and in that the sockets are constructed integrally with the ignition lead arrangement and are covered with the same insulating material as the ignition leads.

Such an ignition lead arrangement can be manufactured in a single operation similar to the printed circuit boards of instrument panels so that it is much less expensive than the prior art ignition lead arrangement consisting of individual ignition leads. Storage costs are eliminated due to the reduction of the number of parts. Furthermore, the ignition lead arrangement can be, as a whole, automatically mounted on the distributor and then connected with the spark plugs and the ignition coil. Contrary to the prior art individual ignition leads, this eliminates the risk of mixing up the ignition leads during production or at the time of spark plug change. It should also be emphasized that the ignition leads are easier to identify in the assembled state and thus they have a better appearance.

The individual flat cables can be removed from the spark plugs for changing the spark plugs particularly easily if, according to an embodiment of the present invention, the spark plug ends of the ignition leads have a pull tab.

The pull tabs can be manufactured particularly easily if the pull tabs are alternately arranged so that a pull tab which is arranged perpendicular to the longitudinal direction of the ignition leads and is next to a pull tab which is arranged in the longitudinal direction of the ignition leads.

The ignition lead arrangement can also be pulled off from the distributor very simply and rapidly if the ignition coil end also has a pull tab.

It is possible to omit additional holders or mounting clips to ensure sufficient distance between the ignition leads and the hot exhaust manifold if the ignition leads have perforations. This makes it possible to simply suspend the flat cables in knobs which are provided on the valve cover of the internal combustion engine.

The process for manufacturing the ignition lead arrangement is accomplished according to the present invention in that the ends of leads which are not yet insulated are connected with sockets having contact eyelets in a vulcanizing apparatus and are then embedded in insulating rubber while extending parallel to each other, the sockets also becoming covered with insulating rubber and that the flat component produced in this way is then cut in from one end to form individual flat leads.

The advantages of such a process follow logically from the above-described advantages. It should be mentioned in the first place that the process is much less expensive than the individual manufacture by hand of five individual ignition cables of different lengths.

BRIEF DESCRIPTION OF THE DRAWING

Numerous embodiments of the present invention are possible. For further illustration of the present invention, one of its embodiments is shown in the drawing and described below on the basis of the drawing. In the drawing.

DETAILED DESCRIPTION OF THE PREFERRED EMBODIMENT

Figure 1:
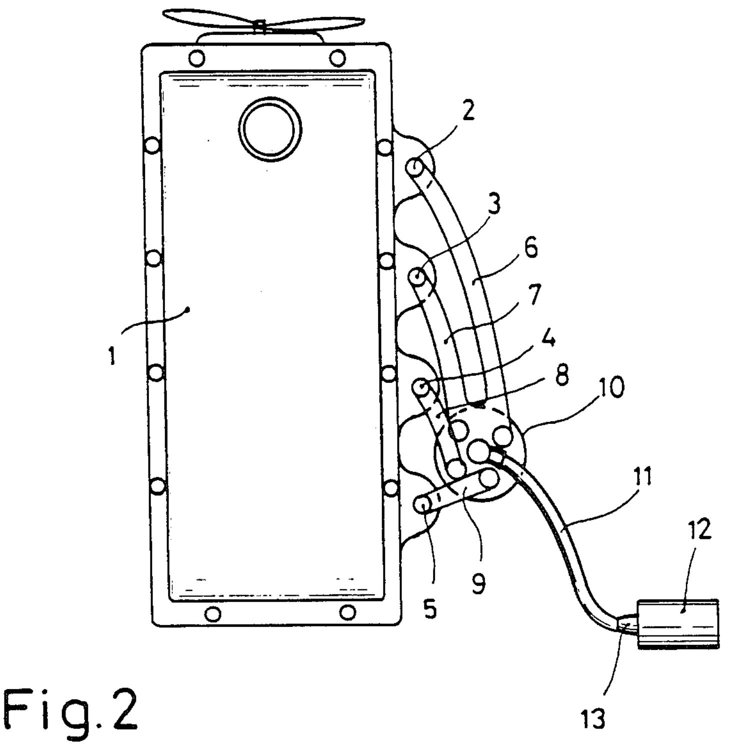
FIG. 1 is a top view of an internal combustion engine showing an installed ignition lead arrangement according to the present invention.

Referring now to the drawing, FIG. 1 shows the engine block 1 of an ordinary in-line four-cylinder engine. Sockets 2, 3, 4, 5 which project from the engine block 1 and which are connected to spark plugs (not shown), are recognizable on the side of the engine block 1. Ignition leads 6, 7, 8 and 9 lead from these sockets 2, 3, 4, 5 to an ignition distributor 10. Another ignition lead 11 leads from the center of the ignition distributor 10 to an ignition coil 12.

Figure 2:
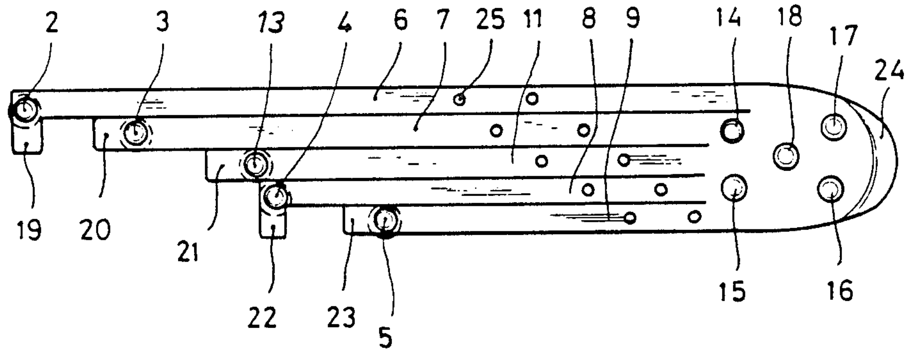
FIG. 2 is a top view of the ignition lead arrangement shown in FIG. 1 before installation.
Figure 3:
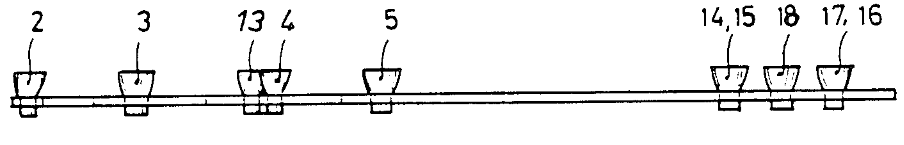
FIG. 3 is a side view of the ignition lead arrangement shown in FIG. 2.

It is important for the present invention that the ignition leads 6–9 and 11 are integrated to a single molding, which can be seen in FIGS. 2 and 3. These FIGS. 2 and 3 show that the ignition leads 6–9 and 11 are constructed as flat strips extending parallel to each other whose ignition coil ends are united to a common molding. The sockets 2, 3, 4 and 5, as well as the socket 13 for connection with the ignition coil 12, are constructed integrally with the opposite free or spark plug ends of the flat strips. The sockets 14–18 for contacting the poles of the ignition distributor 10 are also constructed integrally. Furthermore, pull tabs 19, 20, 21, 22, 23 which make it easier to pull off the individual sockets 2–5 and 13 from the spark plugs and from the ignition coil 12, respectively, are also provided on the free ends of the ignition leads 6–9 and 11. These pull tabs 19–23 are created either by the flat strips extending beyond their corresponding sockets or they are strip parts directed perpendicular to the longitudinal direction of the flat strips.

A pull tab 24 positioned according to FIG. 2, which reaches beyond the ignition distributor 10, so that it can be easily gripped, is also provided for removing the ignition lead arrangement from the ignition distributor 10. The flat cables 6, 7, 8, 9 and 11 have perforations 25 which make it possible to suspend the flat cables on knobs to hold the flat cables in desired positions.

To manufacture the ignition lead arrangement, bare carbon graphite leads cut to the final length are embedded parallel to each other in insulating rubber in a mold. The individual sockets are also made integrally in the same mold. The metallic heat protector can also be mechanically attached by appropriate design of the mold. A single component is thus obtained which can subsequently be handled as one unit.

The embodiments of the invention in which an exclusive property or privilege is claimed are defined as follows:

1. An ignition lead arrangement comprising several ignition leads for connecting an ignition distributor to spark plugs and an ignition coil, characterized in that the ignition leads are constructed as individual, parallel flat cables which, at their distributor end, pass laterally into each other to form a single molding, and plug sockets are constructed integrally with the ignition lead arrangement and covered with the same insulating material as the ignition leads.

2. An ignition lead arrangement according to claim 1, characterized in that each of the ignition leads have a pull tab at the free end which is opposite the distributor end.

3. An ignition lead arrangement according to claim 2, characterized in that the pull tabs at the free ends of the ignition leads are alternately arranged, so that a pull tab which is arranged perpendicularly to the longitudinal direction of the ignition leads is next to a pull tab which is arranged in the longitudinal direction of the ignition lead.

4. An ignition lead arrangement according to claim 3, characterized in that the single molding at the distributor end also has a pull tab.

5. An ignition lead arrangement according to claim 4, characterized in that each of the ignition leads have several perforations for mounting the ignition leads on support knobs.

6. A method for the manufacturing an ignition lead arrangement characterized in that ignition leads which are not yet insulated and which have contact eyelets at their ends are embedded in insulating rubber while extending parallel to each other in a vulcanizing apparatus so that the contact eyelets are also covered with insulating rubber to provide plug sockets and in that the flat insulated component produced in the vulcanizing apparatus is then cut in from one end to form individual flat leads for connection to spark plugs and to an ignition coil.

* * * * *